(12) United States Patent
Bartunek et al.

(10) Patent No.: US 6,346,988 B1
(45) Date of Patent: *Feb. 12, 2002

(54) LASER POSITION ARRAY OPTICAL MEASURING SYSTEM AND METHOD

(75) Inventors: Hans Bartunek, Mountain View; Mark Cerny, Cupertino, both of CA (US)

(73) Assignee: Hama Sensors, Inc., Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,950

(22) Filed: Aug. 1, 1997

(51) Int. Cl.[7] .................. G01B 11/04; G01B 11/10; G01N 21/86
(52) U.S. Cl. .................. 356/635; 356/634; 356/625; 250/559.12; 250/559.13; 250/559.15
(58) Field of Search .................. 356/384, 385, 356/376, 396, 386; 250/559.12, 559.13, 559.14, 559.15; 348/312, 322

(56) References Cited

U.S. PATENT DOCUMENTS

| | | | | |
|---|---|---|---|---|
| 4,097,849 A | * | 6/1978 | Taylor .................. 356/385 |
| 4,403,860 A | | 9/1983 | Pryor | |
| 4,786,126 A | | 11/1988 | Kramer | |
| 4,872,757 A | * | 10/1989 | Cormack et al. .................. 356/376 |
| 4,943,850 A | * | 7/1990 | Asaida .................. 358/55 |
| 5,003,188 A | | 3/1991 | Igari | |
| 5,144,445 A | * | 9/1992 | Higashitsutsumi ..... 358/213.11 |
| 5,225,691 A | | 7/1993 | Powers et al. | |
| 5,278,634 A | * | 1/1994 | Skunes et al. .................. 356/400 |
| 5,327,217 A | * | 7/1994 | Kanai et al. .................. 356/353 |
| 5,377,405 A | | 1/1995 | Sakurai et al. | |
| 5,402,173 A | * | 3/1995 | Noguchi et al. .................. 348/312 |
| 5,408,325 A | * | 4/1995 | Cruickshank .................. 356/385 |
| 5,418,382 A | | 5/1995 | Blackwood et al. | |
| 5,448,362 A | * | 9/1995 | Perchak .................. 356/385 |
| 5,504,345 A | | 4/1996 | Bartunek et al. .................. 250/559.4 |
| 5,521,637 A | * | 5/1996 | Asaida et al. .................. 348/222 |
| 5,600,442 A | | 2/1997 | Minegishi et al. .................. 356/358 |
| 5,606,534 A | * | 2/1997 | Stringer et al. .................. 367/128 |
| 5,608,642 A | | 3/1997 | Onodera | |
| 5,636,026 A | * | 6/1997 | Main et al. .................. 356/385 |
| 5,677,522 A | * | 10/1997 | Rice et al. .................. 235/454 |
| 5,680,218 A | * | 10/1997 | Adams .................. 356/385 |
| 5,871,391 A | | 2/1999 | Pryor | |
| 5,897,611 A | * | 4/1999 | Case et al. .................. 356/375 |

FOREIGN PATENT DOCUMENTS

| | | | | |
|---|---|---|---|---|
| EP | 0578136 A1 | | 1/1994 | |
| EP | 0664666 A1 | | 7/1995 | |
| GB | 2138562 | * | 10/1984 | .................. 356/387 |
| JP | 62-28605 | * | 2/1987 | .................. 356/385 |
| JP | 63-210703 | * | 9/1988 | .................. 356/387 |
| JP | 8-111598 | | 4/1996 | |
| JP | 9-214198 | | 8/1997 | |
| JP | 9-307298 | | 11/1997 | |
| JP | 11-145256 | | 5/1999 | |

OTHER PUBLICATIONS

Patent Abstracts of Japan, Abstract and two (2) figures of JP 09–210639, Aug. 12, 1997.

* cited by examiner

Primary Examiner—F. L. Evans
Assistant Examiner—Zandra V Smith
(74) Attorney, Agent, or Firm—Dicke, Billig & Czaja, P.A.

(57) ABSTRACT

An optical measuring system capable of high resolution measurement of objects, and a method of measuring the same, are provided. The optical measuring system is formed in one integral, portable unit, and includes a laser source having associated optics for emitting a wide collimated light beam. A CCD receiver and a processor housed together and spaced apart from the laser source receive the wide collimated light beam. The CCD receiver has a plurality of diode cells, or "pixels," formed in a linear array, and the diode cells exhibit output signals corresponding to the received light beam. The processor processes the output signals and determines a measurement associated with the output signals.

45 Claims, 10 Drawing Sheets

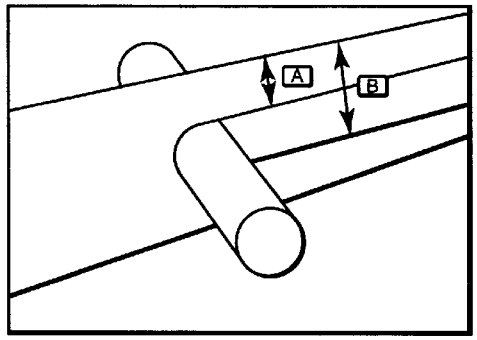 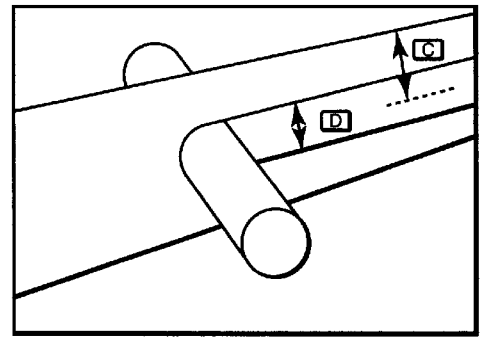
Fig. 6a  Fig. 6b
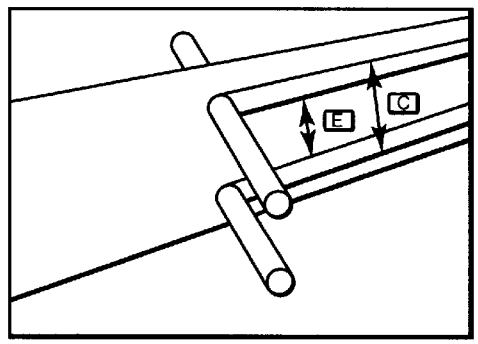
Fig. 6c
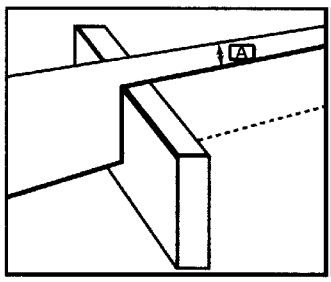 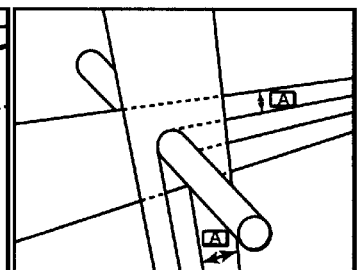 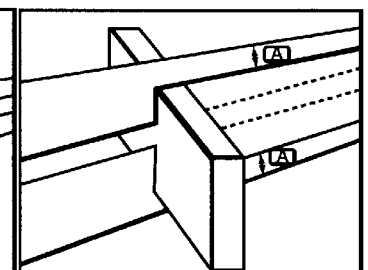
Fig. 7a  Fig. 7b  Fig. 7c

LASER POSITION ARRAY OPTICAL MEASURING SYSTEM AND METHOD

The present invention relates generally to sensors useful for measuring objects, and more specifically relates to an optical measuring system including a laser position array and method.

BACKGROUND OF THE INVENTION

The use of sensors in a variety of industries has steadily risen over the years. One widespread application for sensors is the measurement of objects to determine their size, position, number, and the like. Such measurement information is often critical for inspection and quality control efforts. Further, industrial management techniques such as tracking work in progress inventories requires accurate numbers of product be determined. Various types of measuring sensors have been employed in the art. One such sensor is a contact micrometer, which requires physical contact by a measurement arm with the object to be measured. Such sensors may cause deformation and possibly surface damage to the object, and are poorly suited for production line applications where objects are moving. Such sensors are slow, may be unreliable and subject to costly maintenance needs.

Optical sensors, particularly laser based sensors, offer improved measuring capability. Many optical sensors used to measure objects employ reflective techniques. Such reflective type optical sensors are poorly suited to measure specular surfaces and surfaces with minimum reflectivity. Such sensors also suffer from slow response time and problems with laser beam alignment. Other types of optical sensors known in the art require remote processors with slow processing speeds and thus slow response time, and are of large size with high maintenance moving parts.

To accommodate applications that require measurement of rapidly moving objects, it is desirable to provide a sensor with a fast response time. Slow sensors can cause bottlenecks in the production line and even reduce the operating speed of the production line, resulting in costly inefficiencies. Moreover, it is desirable in many applications to produce measurements of high resolution, on the order of microns. Finally, equipment space is usually at a premium, whether it is on the production floor or in a laboratory environment, and thus it is desirable to provide a sensor that is compact and portable.

OBJECTS AND SUMMARY OF THE INVENTION

Accordingly, it is a general object of the present invention to provide an improved optical measuring system.

Another object of the present invention is to provide an optical measuring system capable of achieving a high resolution measurement with rapid response.

Yet another object of the present invention is to provide a compact and portable optical measuring system that is self contained with a processor housed in the same unit.

More specifically, it is an object of the present invention to provide an optical measuring system including a laser source and a CCD receiver having a linear array of diode cells.

Another object of the present invention is to provide a method of measuring an object using an optical system.

A further object of the present invention is to provide an optical measuring system capable of measuring multiple rapidly moving objects.

Yet another object of the presention is to provide an optical measuring system capable of filtering spurious signals, caused by contaminants and the like, from the measurement.

These and other objects and advantages are achieved by the optical measuring system of the present invention, the system being formed in one unit and comprising a laser source having associated optics for emitting a wide collimated light beam. A CCD receiver, spaced apart from said laser source, receives the wide collimated light beam. The CCD receiver has a plurality of diode cells, or "pixels," formed in a linear array. The diode cells exhibit output signals corresponding to the received light beam. A processor processes the output signal corresponding to the light detection characteristics and determines a measurement associated with the output signals.

In an alternative embodiment of the invention, a method of measuring an object is provided, comprising: emitting a wide collimated light beam from a laser source. The light beam is received at a CCD receiver, spaced apart from the laser source, and having a CCD clock and a plurality of diode cells formed in a linear array. The diode cells are activated, such that the diode cells exhibit light detection characteristics corresponding to the received light beam. An output signal corresponding to the light detection characteristics is generated, and a measurement associated with the output signal is made.

BRIEF DESCRIPTION OF THE DRAWINGS

Additional objects and features of the present invention will become apparent upon reading of the detailed description of the invention and the appended claims provided below, and upon reference to the drawings in which:

FIGS. 6a through 6c illustrate measurement modes utilizing the optical measuring system in accordance with three embodiments of the invention.

FIGS. 7a through 7c illustrate additional measurement modes utilizing the optical measuring system of the present invention.

FIGS. 9b and 9c are cross-sectional side and bottom plan views, respectively, of the optical measuring system according to the embodiment of FIG. 9a.

DETAILED DESCRIPTION OF THE INVENTION

Figure 1A:
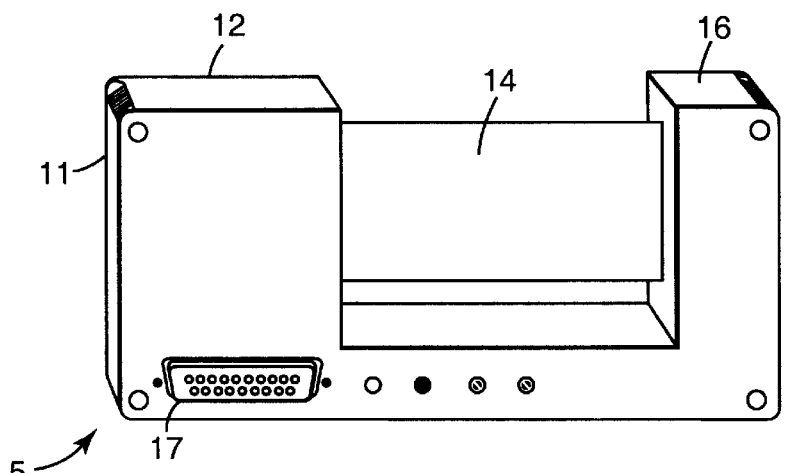
FIGS. 1a and 1b show front perspective views of two embodiments of the optical measuring system of the present invention.
Figure 1B:
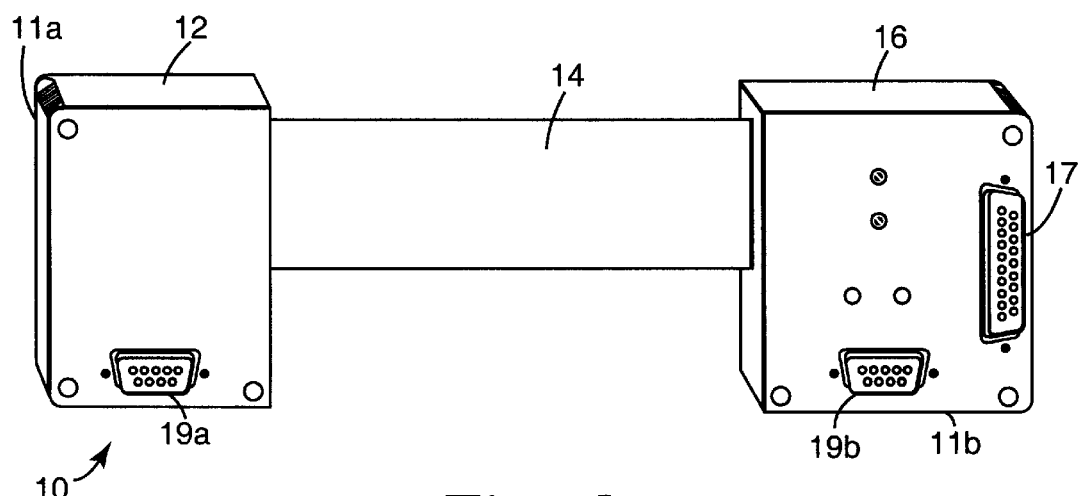

Turning to the drawings, wherein like components are designated by like reference numerals, FIGS. 1a and 1b represent two embodiments of the present invention. FIG. 1a shows an optical measuring system 5 enclosed in a single housing 11. The housing 11 contains a laser source 12 and a CCD receiver 16. The laser source 12 emits a wide collimated light beam 14 which is directed towards the CCD receiver 16. The CCD receiver 16 is spaced apart from the laser source 12 for receiving the light beam 14. Of particular advantage, a processor 18 including associated control logic for determining measurements of objects placed within the light beam 14 is also contained within the single housing 11. As shown, the optical system is provided in a convenient, self-contained package. The optical system 5 may interface to an external controlling device, such as an interface display or computer via host connector 17.

An alternative embodiment of the optical measuring system is shown in FIG. 1b where the optical measuring system 10 comprises two separate housings 11a and 11b. This allows the laser source 12 and the CCD receiver 16 to be further spaced apart for accommodating various industrial applications. The processor 18 is contained within housing 11b, again providing a self contained, integral unit. This embodiment allows the laser source 12 and the CCD receiver 16 to be placed opposite one another, for example such as on each side of the assembly line. The laser source 12 and CCD receiver 16 are connected via interconnect connectors 19a and 19b.

The objects to be measured are placed in the wide collimated light beam 14, where the object causes an interruption in the light beam focused on the CCD receiver 16. A block diagram of the optical system in accordance with one embodiment of the present invention is shown in more detail in FIG. 2. To emit the wide collimated light beam 14, the laser source 12 generally includes a laser driver circuit 26, at least one laser 28 and a plurality of optical lenses 30. To emit the light beam, the laser driver circuit sends a signal to the laser diode 28. Preferably the laser is a semiconductor laser diode, such as a 800 nm Invisible pulse Class I laser as known in the art. The laser 28 has a divergence angle in the range of about 40 degrees, and creates a wide beam that is projected onto the optics 30. The optics 30 focus and project the light beam toward the CCD receiver which captures the light. Of particular advantage, special optics 30 are employed by the invention. Preferably, the optics are suited to substantially eliminate aberration and provide a flat wavefront, such that the emitted light beam 14 is substantially linear. Preferably, the optics collimate the light and each subsection of the light beam will be collimated in addition to the light beam 14 being collimated as a whole. Thus, distortion is minimized, thereby allowing the system to achieve measurements of high resolution. Preferably the optics utilized are dublets or triplets.

The CCD receiver 16 generally includes a CCD device 40 having a plurality of diode cells, or pixels, formed in a linear array 42, orientated in a vertical manner. An optical filter 41 is placed adjacent to the linear array to filter out ambient light. The linear array of pixels is generally aligned with the emitted light beam 14. At least one object to be measured is placed in the wide collimated light beam 14. The location of the object(s) causes interruptions in the light beam 14. It is to be understood that objects of various sizes and shapes may be measured by the inventive system, and of particular advantage, rapidly moving objects may be measured.

The interrupted wide collimated light beam 14 is received by the CCD receiver 16. Each of the plurality of diode cells exhibit output signals corresponding to the amount of light received from the light beam 14. Coupled to each of the CCD receiver 16 and the laser source 12 is a processor 18 for processing the output signal from the plurality of cells 42, and for determining a measurement associated with the output signal. The optical measuring system may be coupled to a display device or other computer interface through host connector 17 which communicates via data output line 20 and control input line 21, with the output being in a parallel data format. The invention provides that various measurements of objects placed in the path of light beam 14 may be made. To select various measurement modes a selector 24 is provided. In an alternative embodiment of the invention a digital filter may be employed to filter out certain sized objects (as described in further detail below) by engaging the selector 24.

To measure an object, the invention provides high resolution results by employing signal processing techniques in processor 18. In an alternative embodiment, a digital filtering technique may be additionally employed to filter out certain sized objects from being measured. In another alternative embodiment, a masking active video signal may be selected that allows the user to select a portion of the collimated light beam to be processed.

The processor 18 is further described with reference to FIG. 3. The processor 18 generally includes an analog circuit 34 and a digital logic circuit 36. Preferably, the digital logic circuit 36 is implemented by a field programmable gate array (FPGA). In the exemplary embodiment the analog circuit 34 includes a low pass filter 37 and a digitizer 38, where the output signal from the CCD receiver 16 is filtered and then digitized to produce a digital serial data line. Said serial line is input to the digital circuit 36. The control logic of digital circuit 36 generally includes trigger logic 40, pixel counter 42, latch gates 43 and 44, an adder/multiplexer 46 and output buffer 48. Also included are a CCD clock generator 50 and exposer counter/timer 51, both driven by oscillator 52. The invention also provides a mode setting selector 24 and a digital filter selector 25 with associated digital filter 54 which may be selected by the user.

The CCD clock generator generates the CCD receiver clock and is coupled to the logic circuit via exposure counter/timer 51 and pixel counter 42. The exposure counter/timer 51 acts as the main timer for the system and creates the measurement period for collection of the data. Further, the exposure counter/timer 51 selects a portion of the light beam for processing if the active video masking signal feature is selected.

In the preferred embodiment, the digital logic circuit is comprised of a field programmable gate array (FPGA) which is configured to provide various logical operations locally within the optical measuring system in response to user selectable measurement modes. A variety of measurement modes may be selected including an object's diameter, left edge, right edge, center, or the distance between a plurality of objects. Measurements are made by conventional measurement algorithms, that are hardwired circuits in the FPGA. When the user selects a particular measurement mode, certain parts of the circuit are enabled by selection lines input into the FPGA causing certain circuits to be enabled depending on the operational mode. More specifically, the pixel counter counts the pixels according to the mode setting selected by the user. The latches 43 and 44 are triggered by the trigger logic 40 to latch certain pixel numbers depending upon the measurements to be made. For example, when the user selects an edge measurement mode, the trigger logic will command the first latch 43 to latch the pixel number which corresponds to the first interruption in the light beam 14. The next interruption is latched by the second latch 44. When the center of an object is to be measured, the adder/multiplexer 46 is used to add the latched pixels representative of the interruptions to obtain the center measurement. When the diameter of an object is to be measured, the pixel counter starts counting after the first interruption, and latches the data at the second interruption. The outputs are held in output buffer 48. A two wire handshake is provided that is suitable for polling or interrupt driven methodology and enables the output data to be held until requested by an external interface computer. This also allows external computers with slow processing speeds to slip several measurement cycles between taking readings.

Of particular advantage, high measurement resolution is achieved by signal processing techniques in accordance with the present invention. Such signal processing techniques are further described with reference to FIG. 4. The CCD receiver 16 has a certain measurement period during which it collects the light from the collimated wide beam 14, and converts the received light to electrical charge by the diode cells 42. In an exemplary embodiment, the measurement time for the CCD receiver 16 is 1.0 msec. If the object to be measured is moving, the image received would be blurred due to its movement. For example, the inventive optical measuring system may be employed to measure the centricity of a semiconductor wafer. In this application, the wafer will spin during the 1 msec period which will result in a blurred image. To prevent blurring in such applications, in the preferred embodiment, the laser source 12 is pulsed. In particular, the linear array of pixels 42 in the CCD receiver 16 collects the light during illumination of the laser, and then terminates the measurement process. The data collected by the CCD receiver 16 is output in a serial manner for each 1.0 msec period. This data collected is often referred to as a sample or frame. The laser pulses again, and the CCD receiver 16 then collects another frame of data. In the preferred embodiment the object is illuminated for approximately ⅕ to ¼ of the overall measurement period of the CCD receiver, and most preferably the laser 28 is on for only the first 200 microsec of the 1.0 msec measurement period.

In an exemplary embodiment, each pixel within the linear array is 10 microns high by 10 microns wide, and the array contains approximately 2500 individual pixels. In a measuring system using conventional processing techniques, this limits the resolution of the measurement to increments of 10 micron.

Figure 4:
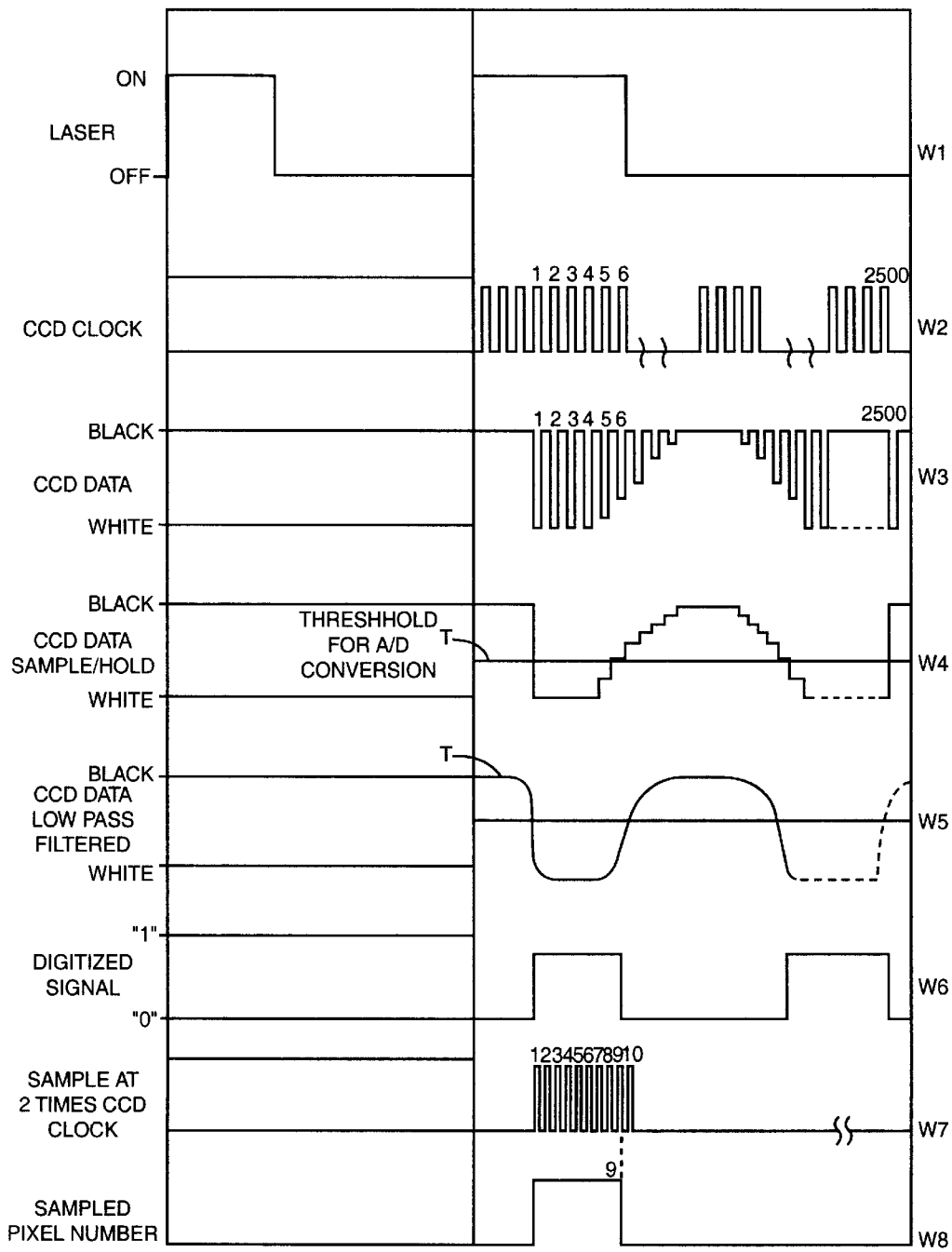
FIG. 4 is a diagram showing various signal waveforms produced during operation of the optical measuring system of the present invention.

Of particular advantage, the present invention provides a system capable of sub-pixel resolution. Specifically, certain signal processing techniques are employed. Turning to FIG. 4, a diagram showing various signal waveforms observed during operation of the optical measuring system is provided. Signal W1 is the waveform of the laser pulse generated by the laser source 12. As described above the laser is illuminated for a portion of the 1 msec measurement period of the CCD receiver 16. Signal W2 represents the CCD receiver clock signal and shows 2500 pixel data output per measurement period. During the 1 msec exposure time, the array of pixels produces an output signal as shown by signal W3. The output signal corresponds to light detection characteristic, i.e. certain pixels are illuminated by the light beam 14 and certain pixels are not illuminated due to the placement of an object in the beam 14 which blocks the light. Specifically, as shown by signal W3, the black level means that the pixel is not illuminated, which indicates that the light beam 14 is covered with the object, while the white level means that the pixel is illuminated. A pixel may fall between the black and white levels as shown by pixels 5 and 6 in signal W3.

To perform the various measurements, the edge of an object placed in the light beam 14 is defined. Further the inventive system enables the edge to be defined with high resolution. The present invention recognizes the fact that this edge is not composed of one pixel, but of several pixels (even the use of laser light results in a signal with a slope that covers several pixels). To define the object with high resolution it is desirable to pinpoint the position where the pixel turns from white level to black level, i.e. the threshold cross-over point. The optical measuring system of the present invention is suited to process the output signal to define the threshold cross-over which corresponds to the edge of the object. In the preferred embodiment, the signal W3 is applied to a circuit that samples and holds the data, so that only the actual pixel level is retained, thereby creating a signal of the envelope of the pixel levels as shown in W4. This circuit is called a sample/hold circuit and may be incorporated into the CCD receiver 16. A CCD receiver, such as model NEC 3594 known in the art, contains sample/hold circuity and finds use in the present invention. A threshold T for analog to digital conversion is defined by a trim-potentiometer and this threshold also defines the point where once the signal passes above the threshold it will take an object as present, and when the signal is below the threshold the object is considered not present.

To provide sub-pixel resolution, the step-wise waveform of W4 is smoothed by passing the signal through a low pass filter. The low pass filter passes only the slower rates of change, and not the faster rates of change. The resultant signal, as shown in W5, becomes smooth with no step increments. Next the signal W5 is digitized to produce the digital signal W6. The digitized signal W6 produces a vertical edge at the position where the signal W5 crosses the threshold T. This sharp edge corresponds to the edge of the object placed in the light beam 14 and can now be compared to the CCD clock signal W2 to identify its corresponding pixel number. To determine this value with high resolution the invention provides for interpolating the digital signal W6 at a frequency greater than the CCD clock frequency. Thus, the invention interpolates between the individual pixels to obtain sub-pixel resolution. Preferably, the interpolation is performed at twice the frequency of the CCD clock frequency or greater, with a frequency at 2 to 4 times the CCD clock frequency being most preferred. In an exemplary embodiment, consider pixel 4 of CCD clock signal W2. When interpolating at twice the CCD clock frequency, pixel 4 of signal W2 becomes pixel 8 of signal W7, and likewise, and pixel 5 of signal W2 becomes pixel 10 of signal W7. Such interpolation creates a phantom pixel, "pixel 9" which provides information in between original pixels 4 and 5, and allows the edge of an object placed in the light beam 14 to be determined with sub-pixel resolution.

In an alternative embodiment of the invention, an active video masking signal may be employed to designate a certain portion of the CCD receiver 16 as active for data processing. This feature has a number of advantages. The active masking signal may be used to omit a certain portion of the beam 14, such as the edges, where distortion may occur. Additionally, the active masking signal may be used to accommodate reduced processing capacity. For example, there are approximately 2500 pixels in the linear array 42, and if the signal is sampled at a frequency of four times the CCD receiver clock frequency, there would be a total of 10,000 outputs. To minimize this output load, the processor 18 may be configured to process only a portion of the light beam 14, i.e. the active masking signal. The active video masking signal is implemented within the processor 18 of the optical measuring system.

In another alternative embodiment of the invention, a digital filter may be employed. The digital filter is a user selectable feature that allows the user to define a certain sized object that will not be processed (i.e. ignored) by the optical measuring system. This is particularly useful when the optical measuring system is used in an environment where contaminants such as dust particles or hair are likely to be present in the light beam 14. It is useful to block out such contaminants so they do not disrupt the measurements.

Figure 2:
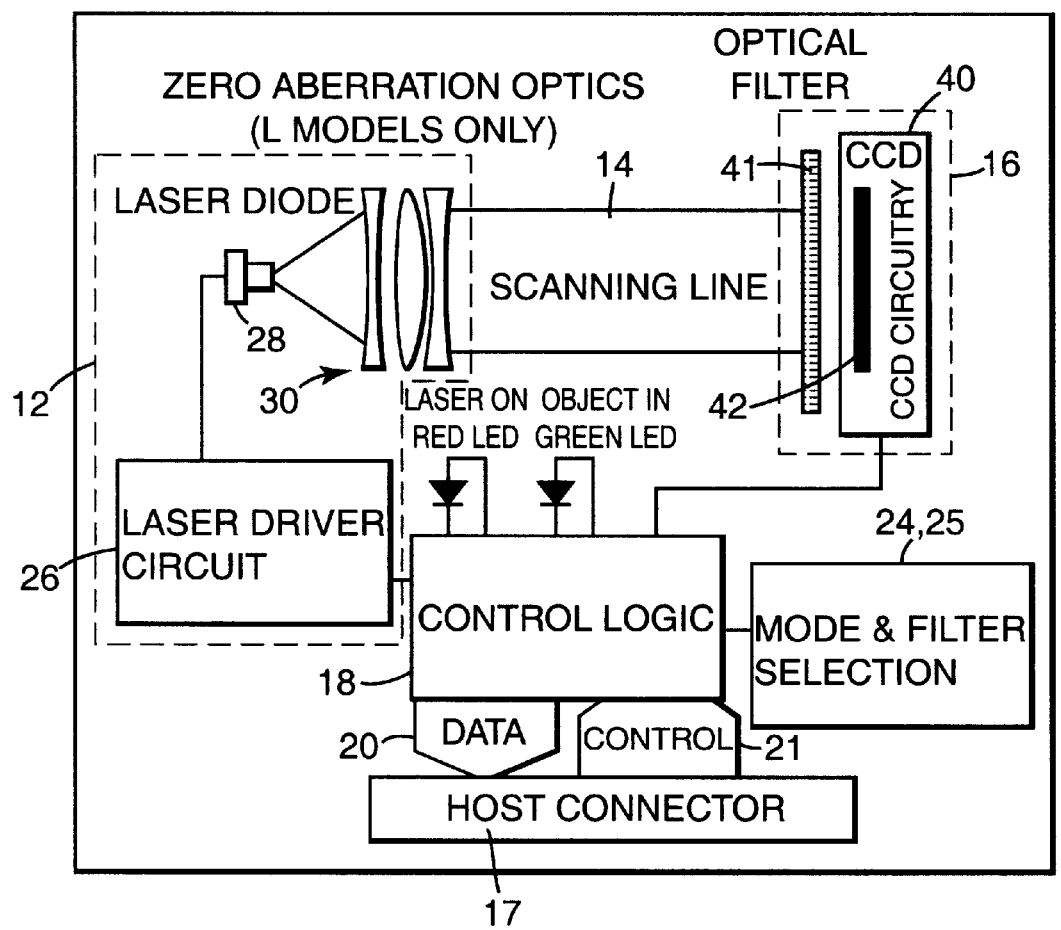
FIG. 2 is a block diagram of the optical measuring system in accordance with one embodiment of the present invention.
Figure 3:
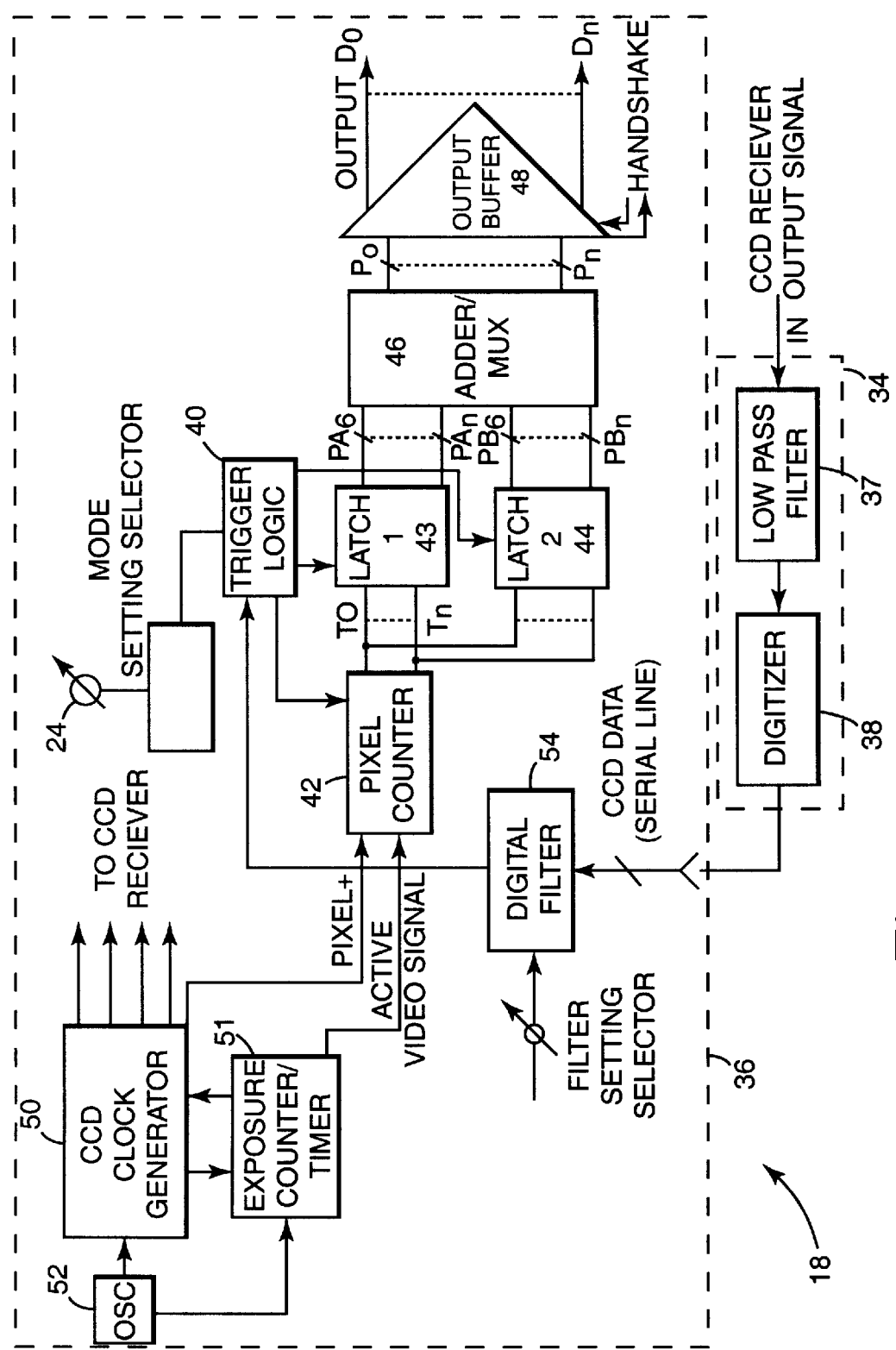
FIG. 3 is a block diagram of the processor for the optical measuring system in FIG. 2 in accordance with one embodiment of the present invention.

The digital filter 54 is shown in FIGS. 2 and 3. To configure the digital filter 54, the user presets the minimum size of the object to be measured by the optical measuring system via selector 25. For example a user may set the minimum size of the object as 50 microns, which corresponds to approximately 5 pixels. The filter receives the data from the linear array in sequence and stores the data in memory. For a filter of 5 pixels, the memory will store five pixel data inputs. The filter will not generate an output until all five pixel data inputs are of the same type. Thus, the filter ignores objects that are less than 5 pixels. For example, if two black pixels and three white pixels are input, the filter output is still white and does not show the two black pixels. The filter uses an and gate, and until all of the pixel data inputs are of the same type, the filter output does not change.

Figure 5A:
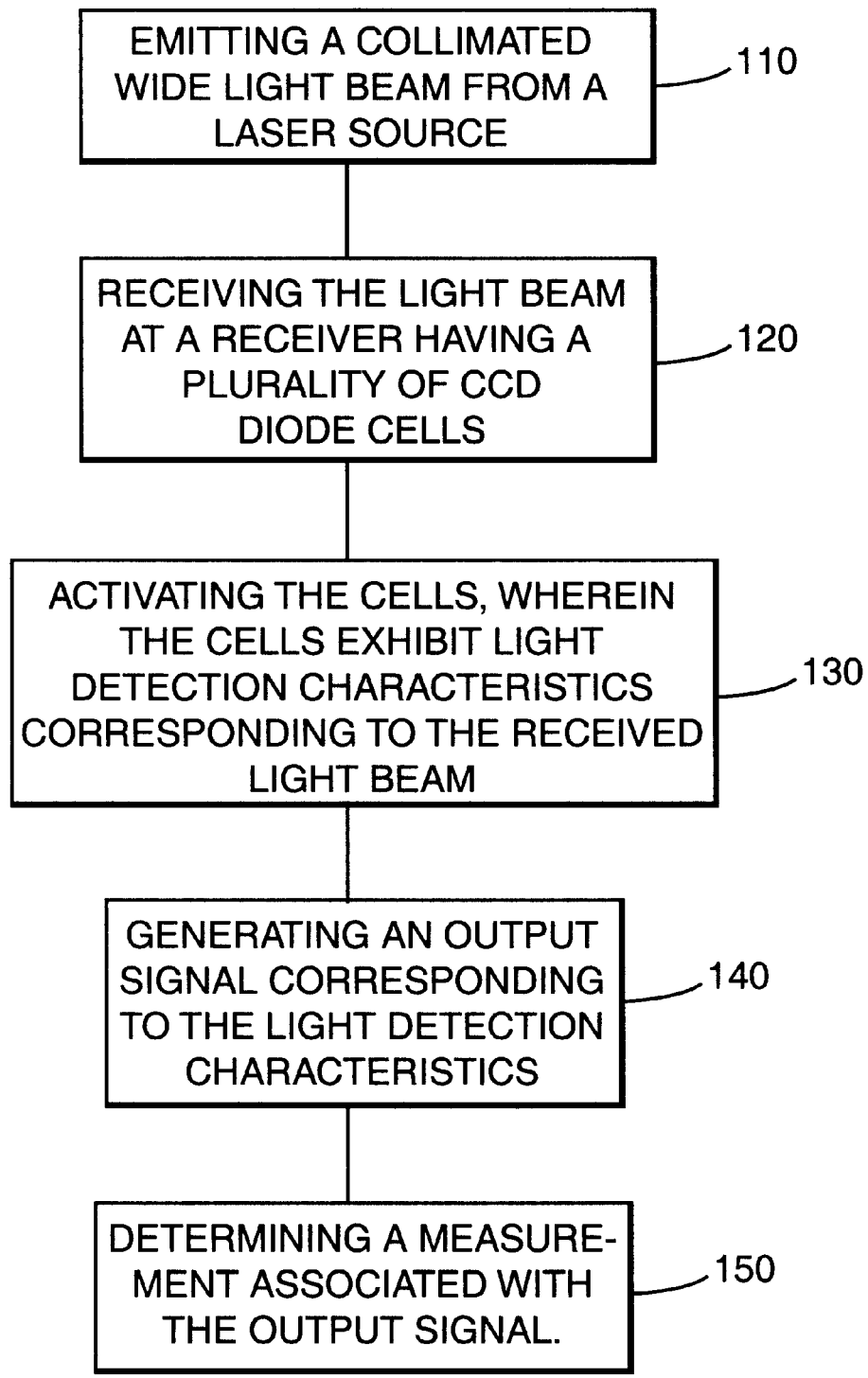
FIGS. 5a and 5b show a flowchart depicting the operation of the optical measuring system in accordance with two embodiments of the present invention.
Figure 5B:
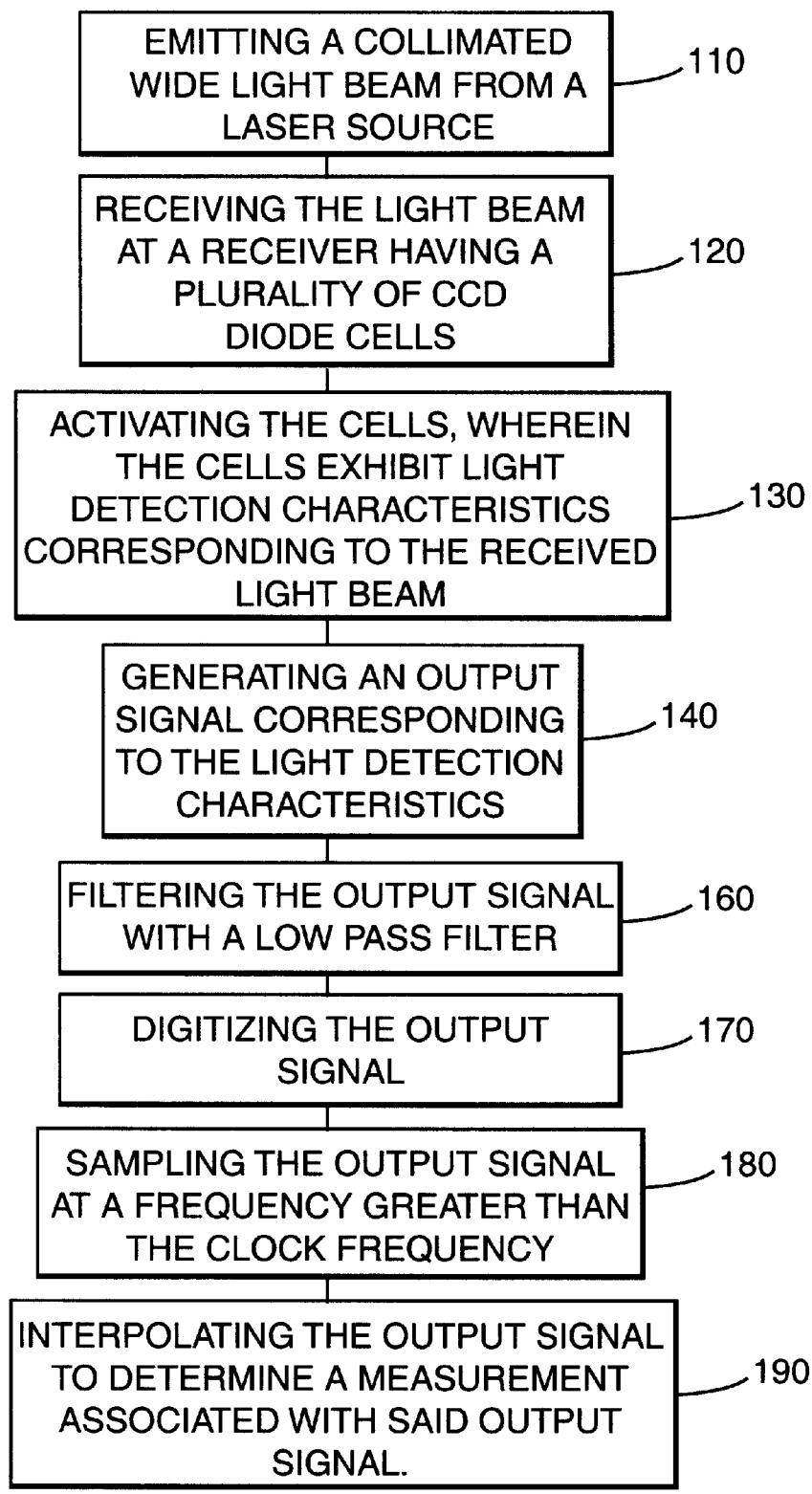

In an alternative embodiment, a method of measuring objects is provided. FIGS. 5a and 5b are flowcharts depicting the method of measuring objects in accordance with two embodiments of the present invention. In the first embodiment shown in FIG. 5a, the method comprising the following steps. In the first step 110, a wide collimated light beam is emitted from a laser source. The light beam is received at a CCD receiver, spaced apart from the laser source, and having a CCD clock and a plurality of diode cells formed in a linear array in step 120. Next, at 130, the diode cells are activated, such that the diode cells produce an output signal corresponding to the received light beam. An output signal corresponding to the light detection characteristics is generated in step 140, and in step 150 a measurement associated with the output signal is made.

In an alternative embodiment, as shown in FIG. 5b, the method comprises the first four steps, 110–140 as above, and then further processes the output signal. At step 160 the output signal is filtered with a low pass filter. The output signal is next digitized to produce a digital output signal in step 170. The digital output signal is then sampled at a frequency greater than the CCD receiver clock frequency in step 180. In step 190 the digital output signal is interpolated to determine a measurement associated with the digital output signal.

A variety of measurements by be taken by the present invention as shown in FIGS. 6 and 7. In FIG. 6a the upper edge of an object 60 may be determined as shown by measurement A, the distance from the top of the light beam 14 to the first interruption in the light beam 14. In this mode the upper edge or the depth of the object from the top of the light beam 14 is measured. The lower edge measurement is determined by measurement B, the distance from the top of of the light beam 14 to the last interruption in the light beam 14. In this mode the lower edge is measured. In FIG. 6b the center and diameter of the object are shown. The center measurement is shown by measurement C, the average of the distance to the first interruption and the distance to the last interruption. In this mode the object s center position is determined. The diameter measurement is shown by measurement D, the distance from the first interruption to the last interruption. Further the gap between objects may be determined by gap measurement E, is shown in FIG. 6c. The gap measurement E is the distance from the first transition interruption/not interrupted to the last transition not interrupted/interruption. In this mode the object s inner diameter (the gap between objects) is measured.

FIGS. 7a–7c show further applications of the edge measurement mode in FIG. 6, FIG. 7a shows the measurement of the two dimensional profile of a moving object, such as the edge of a sheet. FIG. 7b shows the measurement of the x-y axis of objects using two perpendicular light beams 14 from two optical measuring systems. FIG. 7c also shows two optical measuring systems being employed, this time in parallel, to measure the width of a large object.

Figure 8:
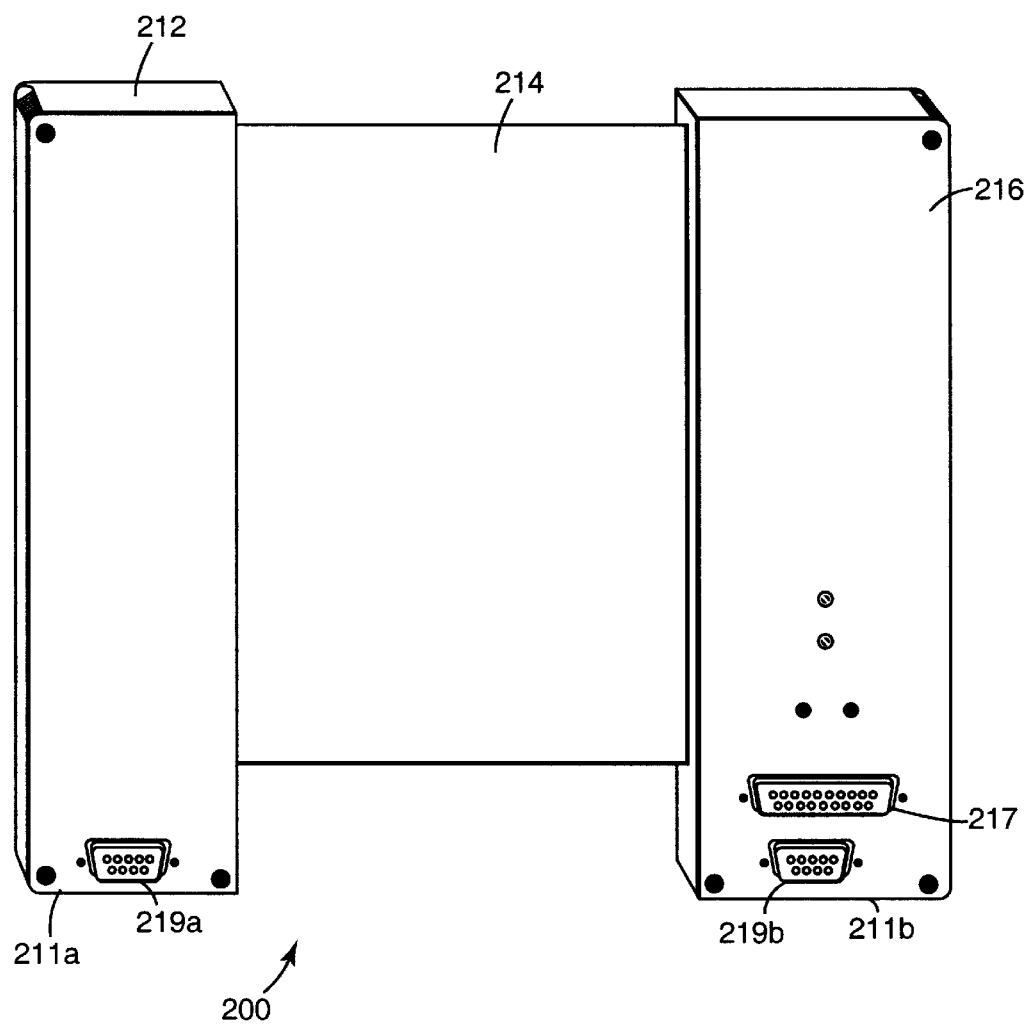
FIG. 8 shows a front perspective view of another embodiment of the optical measuring system of the present invention.

Another alternative embodiment of the optical measuring system 200 of the present invention is shown in FIG. 8. In this embodiment a much wider collimated light beam 214 is used, and in the exemplary embodiment the light beam 214 is approximately 6 inches wide. It should be understood to those of ordinary skill in the however, that various sizes of the light beam may be achieved by the teaching of the invention. The optical system 200 includes two housings 211a and 211b, with a laser source 212, and a CCD receiver 216 spaced apart from the laser source for receiving the light beam 214. A processor 218 (not shown) and associated control logic for determining measurements of objects placed with the light beam 214 are also contained within the housing 211b. The laser source 212 and CCD receiver 216 are connected via interconnects 219a and 219b. The optical system 200 may interface to an external device via host connector 217.

Figure 9A:
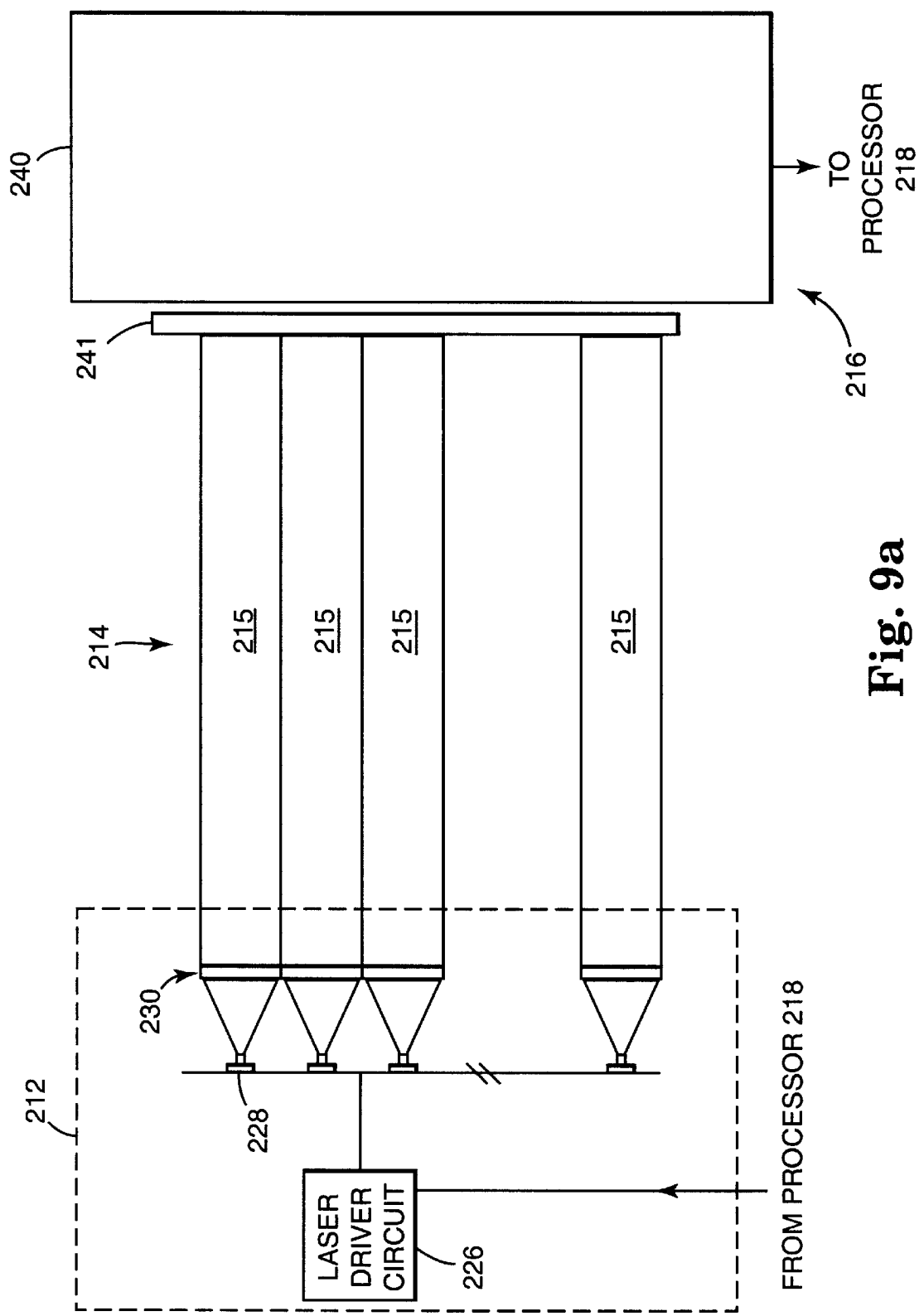
FIG. 9a is a block diagram of the optical measuring system according to the embodiment of FIG. 8.

To maintain the resolution of the light beam 214 over this wider beam distance, the laser source and circuit as described above are used, but this time, multiple lasers 228 are employed as shown in FIG. 9a. This provides a plurality of emitted collimated light segments 215 of high resolution from each of the multiple lasers 228, which then make up the light beam 214. Specifically, as shown in FIG. 9a, the laser source 212 includes a laser driver circuit 226 and a plurality of lasers 228 with a plurality of associated optical lenses 230 (the lenses are shown in simple form for clarity). The optics 230 focus and project a plurality of light beam segments 215 toward the CCD receiver 216. The light beam segments 215 are each collimated, and the segments 215 make up the wide collimated light beam 214.

Figure 9B:
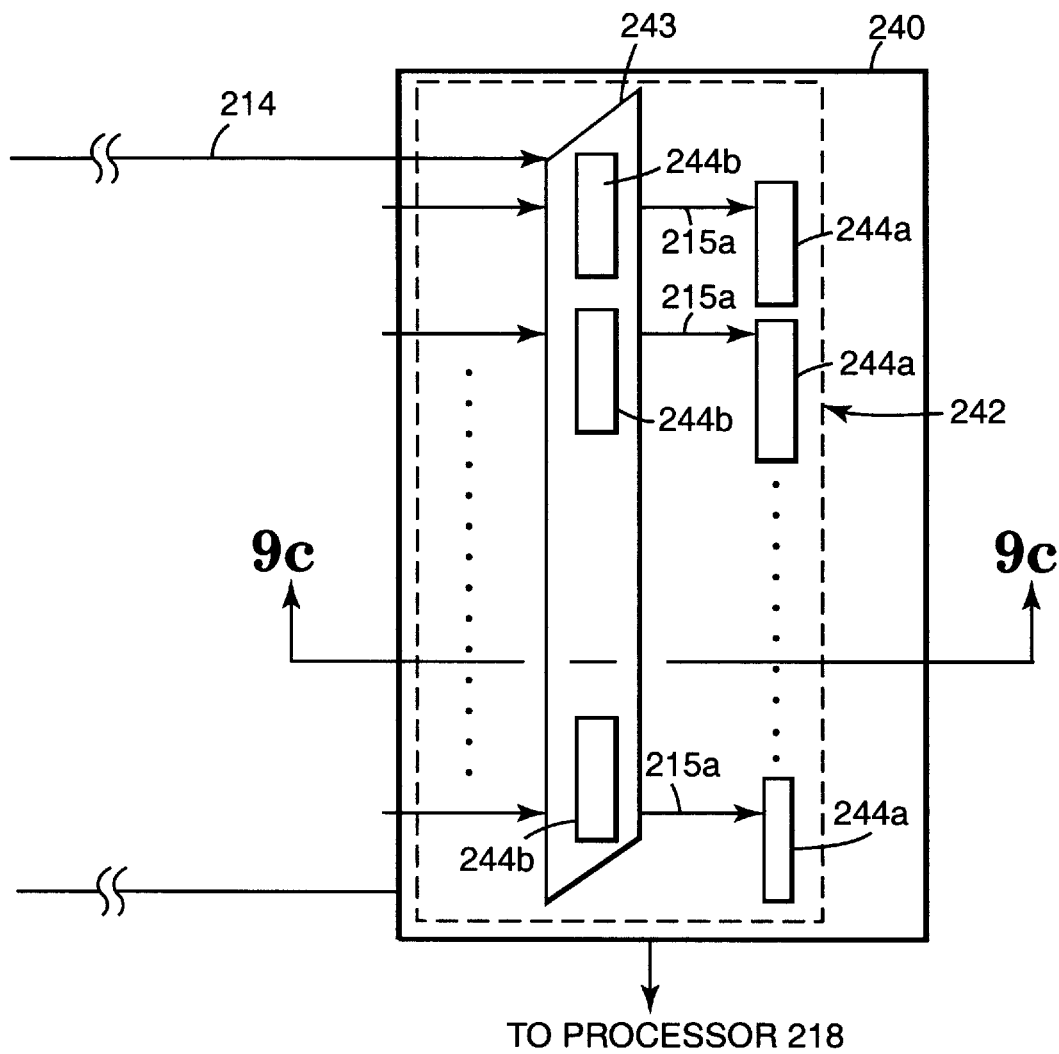
Figure 9C:
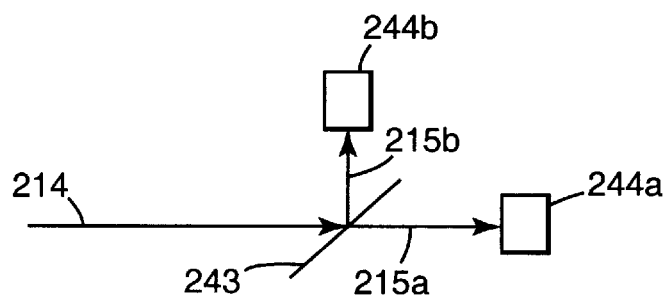

In this embodiment, the CCD receiver 216 includes an optical filter 241 and a CCD device 240 having a diode cell array 242 as shown in greater detail in FIGS. 9b and 9c. To ensure that all of the light in wide beam 214 is received by the CCD receiver, the diode cell array 242 is used. The diode cell array 242 is comprised of a semi-transparent mirror 243 and a plurality of first and second arrays of diode cells 244a and 244b. The semi-transparent mirror 243 receives the light beam segments 215 and splits the light beam such that a portion of the light beam 215a passes straight through the mirror 243 and the remaining portion of the light beam 215b is split and reflected upward In order for the CCD receiver to receive all of the light, the first arrays of diode cells 244a are positioned behind the mirror 243 to capture the light portion 215a that passes through the mirror 243, while the second arrays of diode cells 244b are positioned above the mirror to receive the light portion 215b that is split and reflected upward. To measure objects, as described above, the object is placed in the wide collimated light beam 214 and the interrupted beam is received by the CCD receiver 216. In this embodiment, the first and second arrays 244a and 244b of diode cells receive the light as split by the semi-transparent mirror 243, and each of the plurality of diode cells in the first and second arrays exhibit output signals corresponding to the amount of light received. These output signals are processed by processor 218 in the same manner as described above to provide a measurement of the object.

The foregoing description of specific embodiments of the invention has been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the Claims appended hereto and their equivalents.

We claim:

1. An optical measuring system for measuring an object, comprising:
    an integral unit containing a laser source having associated optics for emitting a wide collimated light beam; and
    a CCD receiver and a processor housed together and spaced apart from said laser source, said CCD receiver including a plurality of diode cells formed in a linear array, for receiving said light beam and wherein each of said diode cells exhibit output signals corresponding to the amount of received light, the linear array of diode cells and the light beam being at least as wide as the object;
    said processor receiving said output signals and generating a measurement signal corresponding to said output signals of said plurality of diode cells;
    wherein said CCD receiver further includes:
        a semi-transparent mirror for receiving said light beam and splitting said light beam into first and second light portions; and
        a plurality of first and second arrays of diode cells, said first array receiving said first light portion, and said second array for receiving said second light portion.

2. The system of claim 1 wherein said CCD receiver includes a CCD clock and said processor includes means for sampling said output signal at a rate greater than said clock.

3. The system of claim 2 wherein said output signal is sampled at a rate of at least twice said CCD clock.

4. The system of claim 1 wherein said processor further includes a low pass filter for filtering said output signal.

5. The system of claim 1 wherein said processor further comprises:
    a low pass filter for filtering said output signal;
    an analog to digital convertor for digitizing said output signal; and
    said interpolator for sampling said output signal at a selected frequency.

6. The system of claim 1 wherein said processor further includes a digital filter having a preselected value wherein said output signal is shifted by said preselected value.

7. The system of claim 1 wherein said processor further includes means for selecting a portion of said light beam for processing and generating an output signal corresponding to the light detection characteristics of the portion of said light beam.

8. The system of claim 1 wherein said measurement associated with said measurement signal is a spatial measurement.

9. The system of claim 1 wherein said measurement associated with said measurement signal is a size measurement.

10. The system of claim 1 wherein said laser source is pulsed.

11. The system of claim 1 wherein said processor includes an analog circuit; and
    a digital circuit, said digital circuit being comprised of a field programmable gate array.

12. The system of claim 1 wherein said laser source further comprises a plurality of lasers each having associated optics for emitting a plurality of collimated light beam segments, and said collimated light beam segments form said wide collimated light beam.

13. The system of claim 1, wherein said optics are configured to emit said wide collimated light beam with substantially zero aberration.

14. An optical measuring system for measuring an object, comprising:
    an integral unit containing a laser source having associated optics for emitting a wide collimated light beam;
    a CCD receiver and a processor housed together and spaced apart from said laser source, said CCD receiver including a plurality of diode cells formed in a linear array, for receiving said light beam and wherein each of said diode cells exhibit output signals corresponding to the amount of received light beam; and
    said processor for generating a measurement signal corresponding to said output signals of said plurality of diode cells, and determining a measurement of the object placed in said light beam, said processor including:
        a low pass filter for filtering said output signal;
        an analog to digital convertor for digitizing said output signal; and
        a field programmable gate array having an interpolator for sampling said output signal at a selected frequency.

15. The system of claim 14 wherein said processor further includes a digital filter having a preselected value wherein said output signal is shifted by said preselected value.

16. The system of claim 14 wherein said processor further includes means for selecting a portion of said light beam for processing and generating an output signal corresponding to the light detection characteristics of the portion of said light beam.

17. The system of claim 14 wherein said laser source is pulsed.

18. The system of claim 14 wherein said optics are configured to emit said wide collimated light beam with substantially zero aberration.

19. The system of claim 14 wherein said laser source further comprises a plurality of lasers each having associated optics for emitting a plurality of collimated light beam segments, and said collimated light beam segments form said wide collimated light beam.

20. The system of claim 14 wherein said CCD receiver further includes:
    a semi-transparent mirror for receiving said light beam and splitting said light beam into first and second light portions; and
    a plurality of first and second arrays of diode cells, said first array receiving said first light portion, and said second array for receiving said second light portion.

21. A method of measuring an object, comprising:
    emitting a wide collimated light beam from a laser source;
    receiving said light beam at a CCD receiver having a CCD clock and a plurality of diode cells formed in a linear array and being spaced apart from said laser source;
    activating said diode cells, wherein said diode cells exhibit light detection characteristics corresponding to said received light beam;
    generating an output signal corresponding to the light detection characteristics;
    interpolating said output signal at a selected frequency;

determining a measurement associated with said output signal; and filtering said out-put signal by a preselected value wherein said output signal is shifted by said preselected value.

22. The method of claim 21 further comprising the steps of:
filtering said output signal with a low pass filter;
digitizing said output signal;
interpolating said output signal by sampling said output signal at a frequency greater than the frequency of said CCD clock; and
determining a measurement associated with said output signal.

23. The method of claim 21 further comprising:
filtering said output signal by a preselected value wherein said output signal is shifted by said preselected value.

24. The method of claim 21 further comprising:
selecting a portion of said light beam for processing; and
generating an output signal corresponding to the light detection characteristics of the portion of said light beam.

25. The method of claim 21 wherein said measurement associated with said output signal is a spatial measurement.

26. The method of claim 21 wherein said measurement associated with said output signal is a size measurement.

27. The method of claim 21 wherein the step of emitting a wide collimated light beam from a laser source further comprises:
pulsing said laser source.

28. A method of measuring an object, comprising:
emitting a wide collimated light beam from a laser source;
receiving said light beam at a CCD receiver having a CCD clock and a plurality of diode cells formed in a linear array and being spaced apart from said laser source;
activating said diode cells, wherein said diode cells exhibit light detection characteristics corresponding to said received light beam;
generating an output signal corresponding to the light detection characteristics;
filtering said output signal with a low pass filter;
digitizing said output signal;
interpolating said output signal by sampling said output signal at a frequency greater than the frequency of said CCD clock;
determining a measurement associated with said output signal; and
filtering said output signal by a preselected value wherein said output signal is shifted by said preselected value.

29. The method of claim 28 further comprising:
selecting a portion of said light beam for processing; and
generating an output signal corresponding to the light detection characteristics of the portion of said light beam.

30. An optical measuring system for measuring an object, comprising:
an integral unit containing a laser source having a plurality of lasers each including associated optics for emiting a pluralty of collimated light beam segments, and said collimated light beam segments forming a wide collimated light beam;
a CCD receiver and a processor housed together and spaced apart from said laser source, said CCD receiver for receiving said light beam, said CCD receiver including a semi-transparent mirror for receiving said light beam and splitting said light beam into first and second light portions, and a plurality of first and second arrays of diode cells, said first arrays receiving said first light portion, and said second arrays for receiving said second light portion, wherein each of said diode cells exhibit output signals corresponding to the amount of received light beam; and
said processor for generating a measurement signal corresponding to said output signals of said plurality of diode cells, for determining a measurement of the object placed in said light beam, said processor including:
a low pass filter for filtering said output signal;
an analog to digital convertor for digitizing said output signal; and
a field programmable gate array having an interpolator for sampling said output signal at a selected frequency.

31. The system of claim 30 wherein said processor further includes means for selecting a portion of said light beam for processing and generating an output signal corresponding to the light detection characteristics of the portion of said light beam.

32. The system of claim 30 wherein said laser source is pulsed.

33. The system of claim 30 wherein said optics are configured to emit said wide collimated light beam with substantially zero aberration.

34. An optical measuring system for measuring an object, comprising:
an integral unit containing a laser source having associated optics for emitting a wide collimated light beam; and
a CCD receiver and a processor housed together and spaced apart from said laser source, said CCD receiver including a plurality of diode cells formed in a linear array, for receiving said light beam and wherein each of said diode cells exhibit output signals corresponding to the amount of received light, the linear array of diode cells and the light beam being at least as wide as the object;
said processor receiving said output signals and generating a measurement signal corresponding to said output signals of said plurality of diode cells, wherein said processor includes an analog circuit and a digital circuit, said digital circuit being comprised of a field programmable gate array;
wherein said processor further includes a digital filter having a preselected value wherein said output signal is shifted by said preselected value.

35. The system of claim 34 wherein said CCD receiver includes a CCD clock and said processor includes means for sampling said output signal at a rate greater than said clock.

36. The system of claim 34 wherein said processor further includes means for selecting a portion of said light beam for processing and generating an output signal corresponding to the light detection characteristics of the portion of said light beam.

37. An optical measuring system for measuring an object, comprising:
an integral unit containing a laser source having associated optics for emitting a wide collimated light beam; and
a CCD receiver and a processor housed together and spaced apart from said laser source, said CCD receiver including a plurality of diode cells formed in a linear array, for receiving said light beam and wherein each of said diode cells exhibit output signals corresponding to the amount of received light;

said processor receiving said output signals and generating a measurement signal corresponding to said output signals of said plurality of diode cells;

wherein said laser source further comprises a plurality of lasers each having associated optics for emitting a plurality of collimated light beam segments, and said collimated light beam segments form said wide collimated light beam.

38. The system of claim 37 wherein said CCD receiver includes a CCD clock and said processor includes means for sampling said output signal at a rate greater than said clock.

39. The system of claim 37 wherein said processor further includes a digital filter having a preselected value wherein said output signal is shifted by said preselected value.

40. The system of claim 37 wherein said processor further includes means for selecting a portion of said light beam for processing and generating an output signal corresponding to the light detection characteristics of the portion of said light beam.

41. An optical measuring system for measuring an object, comprising:

an integral unit containing a laser source having associated optics for emitting a wide collimated light beam; and a CCD receiver and a processor housed together and spaced apart from said laser source, said CCD receiver including a plurality of diode cells formed in a linear array, for receiving said light beam and wherein each of said diode cells exhibit output signals corresponding to the amount of received light;

said processor receiving said output signals and generating a measurement signal corresponding to said output signals of said plurality of diode cells, said processor including an interpolator for sampling said output signals at a selected frequency;

wherein said CCD receiver further includes a semitransparent mirror for receiving said light beam and splitting said light beam into first and second light portions, and a plurality of first and second arrays of diode cells, said first array receiving said first light portion, and said second array receiving said second light portion.

42. The system of claim 41 wherein said CCD receiver includes a CCD clock and said processor includes means for sampling said output signal at a rate greater than said clock.

43. The system of claim 41 wherein said processor further includes a digital filter having a preselected value wherein said output signal is shifted by said preselected value.

44. The system of claim 41 wherein said processor further includes means for selecting a portion of said light beam for processing and generating an output signal corresponding to the light detection characteristics of the portion of said light beam.

45. An optical measuring system for measuring an object, comprising:

an integral unit containing a laser source having associated optics for emitting a wide collimated light beam; and a CCD receiver and a processor housed together and spaced apart from said laser source, said CCD receiver including a plurality of diode cells formed in a linear array, for receiving said light beam and wherein each of said diode cells exhibit output signals corresponding to the amount of received light, the linear array of diode cells and the light beam being at least as wide as the object;

said processor receiving said output signals and generating a measurement signal corresponding to said output signals of said plurality of diode cells;

wherein said laser source further comprises a plurality of lasers each having associated optics for emitting a plurality of collimated light beam segments, and said collimated light beam segments form said wide collimated light beam.

* * * * *